(12) United States Patent
Saha et al.

(10) Patent No.: US 7,687,288 B2
(45) Date of Patent: Mar. 30, 2010

(54) SEALED LIGHTING UNITS

(75) Inventors: Babi Koushik Saha, Brunswick, OH (US); Jeffrey Nall, Brecksville, OH (US); Chunmei Gao, Shanghai (CN)

(73) Assignee: Lumination LLC, Cleveland, OH (US)

(*) Notice: Subject to any disclaimer, the term of this patent is extended or adjusted under 35 U.S.C. 154(b) by 235 days.

(21) Appl. No.: 11/821,683

(22) Filed: Jun. 25, 2007

(65) Prior Publication Data

US 2008/0232105 A1  Sep. 25, 2008

Related U.S. Application Data

(63) Continuation-in-part of application No. 11/725,359, filed on Mar. 19, 2007.

(51) Int. Cl.
*H01L 21/00* (2006.01)

(52) U.S. Cl. .................................. 438/29; 257/E21.504

(58) Field of Classification Search .................... 438/26, 438/28, 29; 257/E21.504
See application file for complete search history.

(56) References Cited

U.S. PATENT DOCUMENTS

| | | | |
|---|---|---|---|
| 6,064,014 A | 5/2000 | McCluskey et al. |
| 6,386,733 B1 | 5/2002 | Ohkohdo et al. |
| 6,660,935 B2 | 12/2003 | Southard et al. |
| 6,821,819 B1 | 11/2004 | Benavides et al. |
| 6,994,455 B2 | 2/2006 | Okabe et al. |
| 7,114,841 B2 | 10/2006 | Aanegola et al. |
| 7,129,722 B1 | 10/2006 | Brophy et al. |
| 7,156,686 B1 | 1/2007 | Sekela et al. |
| 7,160,140 B1 | 1/2007 | Mrakovich et al. |
| 7,165,863 B1 | 1/2007 | Thomas et al. |
| 2003/0142492 A1 | 7/2003 | Sommers |
| 2004/0241525 A1 | 12/2004 | Mekala et al. |
| 2005/0030765 A1 | 2/2005 | Southard et al. |
| 2005/0067681 A1 | 3/2005 | De Villeneuve et al. |
| 2005/0117339 A1 | 6/2005 | Pan |
| 2005/0207151 A1 | 9/2005 | Aanegola et al. |
| 2005/0221659 A1 | 10/2005 | Mrakovich et al. |
| 2005/0227529 A1 | 10/2005 | Mrakovich et al. |
| 2006/0035511 A1 | 2/2006 | Mrakovich et al. |
| 2007/0015396 A1 | 1/2007 | Mrakovich et al. |
| 2007/0087619 A1 | 4/2007 | Nall et al. |
| 2007/0121326 A1 | 5/2007 | Nall et al. |
| 2007/0153508 A1 | 7/2007 | Nall et al. |
| 2007/0202723 A1 | 8/2007 | Varrin |
| 2008/0030981 A1 | 2/2008 | Mrakovich et al. |

FOREIGN PATENT DOCUMENTS

WO  WO 2006/017595 A2  2/2006

*Primary Examiner*—W. David Coleman
(74) *Attorney, Agent, or Firm*—Fay Sharpe LLP

(57) ABSTRACT

A method of manufacturing a lighting module comprises: mounting one or more light emitting diode (LED) packages on a circuit board to define a lighting unit; and injection overmolding the entire lighting unit except the one or more LED packages using a single type of overmolding material. A lighting module comprises: one or more LED packages mounted on a circuit board; and an injection overmolding sealing the circuit board, the injection overmolding not having openings corresponding to piece holding pins, the injection overmolding not covering at least a light emitting portion of the one or more LED packages.

16 Claims, 9 Drawing Sheets

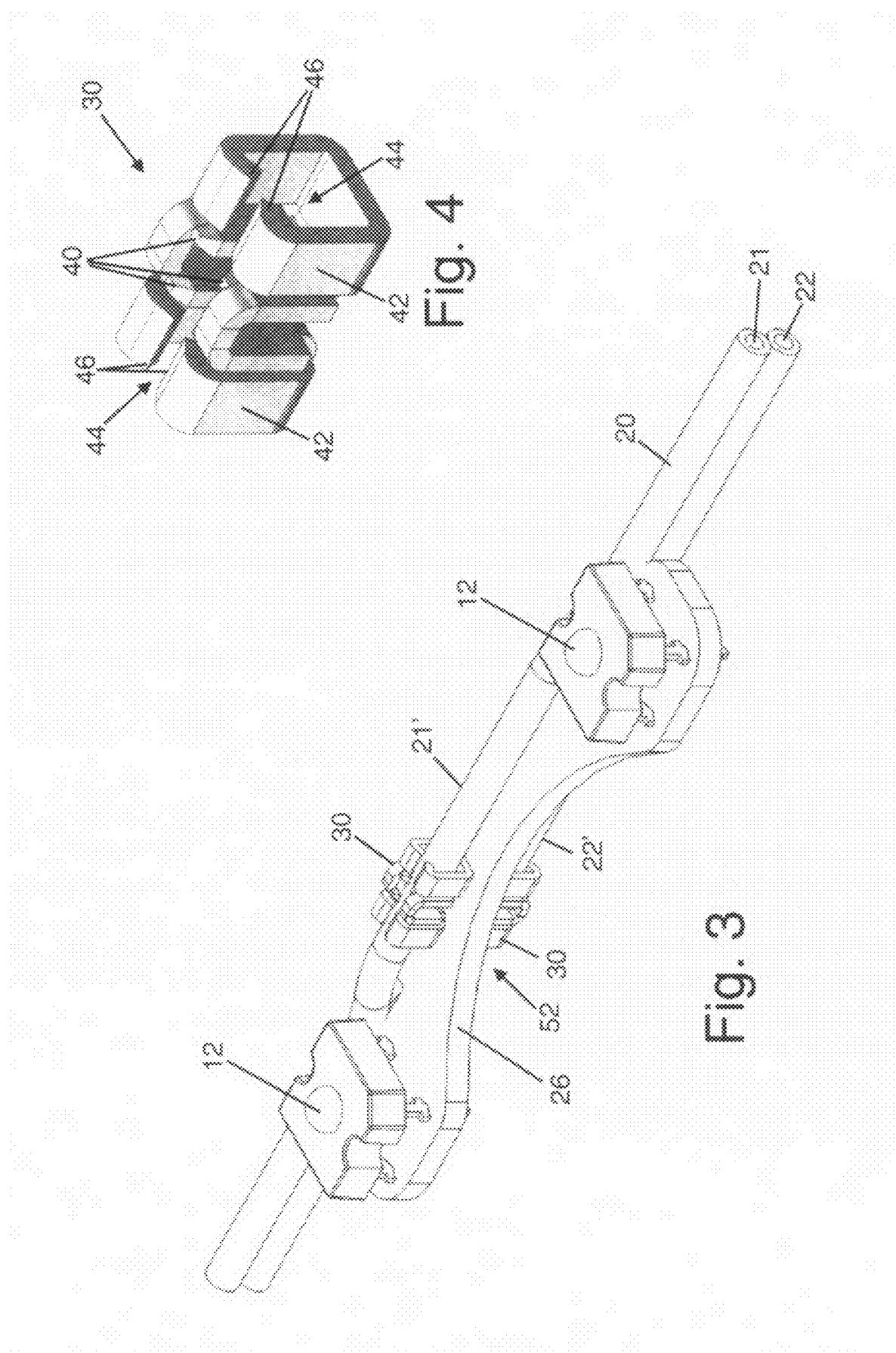

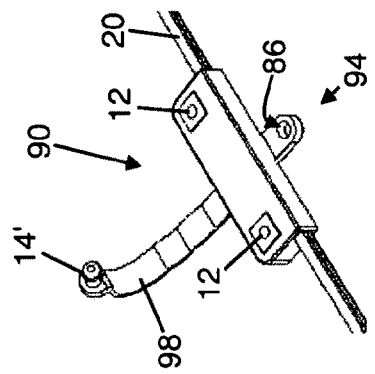
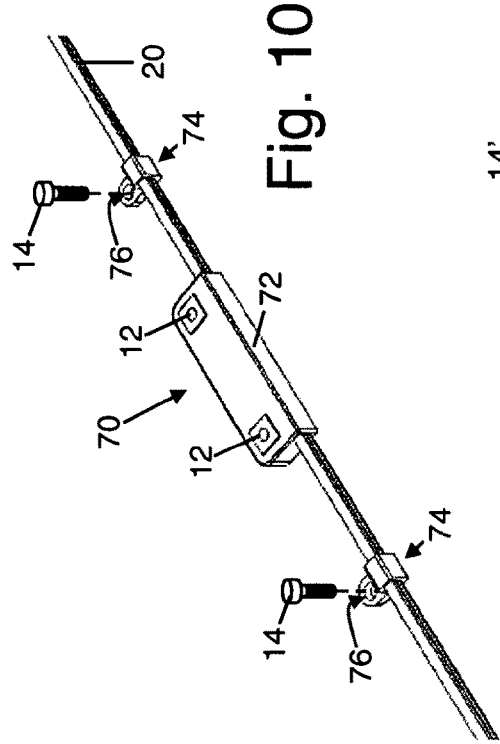
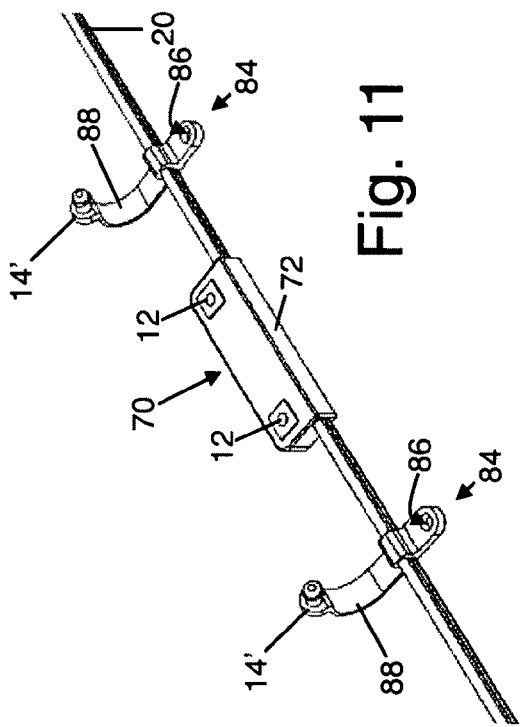

SEALED LIGHTING UNITS

This is a continuation-in-part application of application Ser. No. 11/725,359, filed Mar. 19, 2007. Application Ser. No. 11/725,359 is incorporated herein by reference in its entirety.

BACKGROUND

The following relates to the optoelectronic arts. It finds particular application in illuminated signage. However, the following will find more general application in conjunction with illumination generally, and in lighting applications such as track lighting, illumination of pathways, and so forth.

Lighting units incorporating light emitting diodes mounted on circuit boards are known. In some known embodiments, these devices include a flexible electrical power cord and a plurality of modules attached to the cord in spaced apart fashion, with each module including a main body supporting one or more light emitting diode (LED) packages. These flexible lighting strips find application in various settings, such as illumination of channel lettering for outdoor signage, lighting of curved walkways, and so forth.

Although such flexible lighting strips are known, useful improvements continue to be sought after to enhance manufacturability, ease of installation, reliability and robustness of the devices. Reliability and robustness, for example, is of concern for all applications, and is of particular concern for outdoor applications in which the LED lighting strip may be exposed to rain, snow, large temperature swings, and other environmental hardships. Ease of installation is also of concern for all applications, and is of particular concern for the outdoor signage industry which represents a sizable national and global market for such flexible lighting strips. For example, flexible lighting strips incorporating light emitting diodes are placed in channel letter housings to form illuminated lettering for demarcating buildings, businesses, and so forth.

The following discloses improvements in flexible lighting strips including light emitting diodes.

BRIEF SUMMARY

In accordance with certain illustrative embodiments shown and described as examples herein, a manufacturing method is disclosed, comprising: mounting one or more light emitting diode (LED) packages on a circuit board to define a lighting unit; and overmolding the lighting unit using a multi-step overmolding process including securing the lighting unit in a mold die using first piece holding pins to contact the lighting unit, applying a first overmolding shot to form a first overmolding over a first portion of the lighting unit not including at least the portions of the lighting unit contacted by the first piece holding pins, reconfiguring the mold die by reconfiguration operations including at least extending second piece holding pins to contact the first overmolding and retracting the first piece-holding pins, and applying a second overmolding shot to form a second overmolding over a second portion of the lighting unit including at least the portions of the lighting unit contacted by the first piece holding pins.

In accordance with certain illustrative embodiments shown and described herein, a manufacturing method is disclosed, comprising: mounting one or more light emitting diode (LED) packages on a circuit board to define a lighting unit; and injection overmolding the entire lighting unit except the one or more LED packages using a single type of overmolding material.

In accordance with certain illustrative embodiments shown and described herein, a lighting module is disclosed, comprising: one or more light emitting diode (LED) packages mounted on a circuit board; and an injection overmolding sealing the circuit board, the injection overmolding not having openings corresponding to piece holding pins, the injection overmolding not covering at least a light emitting portion of the one or more LED packages.

In accordance with certain illustrative embodiments shown and described as examples herein, a flexible lighting strip comprises an insulated flexible electrical power cord including generally parallel electrical conductors that are generally secured together, and a plurality of modules spaced apart along and connected with the insulated flexible electrical power cord. Each module includes a circuit board operatively connected with one or more light emitting diode (LED) packages and electrically connected with the insulated flexible electrical power cord to receive electrical power from the insulated flexible electrical power cord. The circuit board has a cavity, indentation, or opening. Each module further includes an overmolding substantially encasing at least the circuit board. The overmolding defines a slot or opening aligned with the cavity, indentation, or opening of the circuit board. The slot or opening is configured to receive an associated fastener to fasten the module without applying substantial mechanical stress to the circuit board.

In accordance with certain illustrative embodiments shown and described as examples herein, a flexible lighting strip comprises an insulated flexible electrical power cord including generally parallel electrical conductors that are generally secured together, and a plurality of modules spaced apart along and connected with the insulated flexible electrical power cord. Each module includes a circuit board operatively connected with one or more light emitting diode (LED) packages, the generally parallel electrical conductors of the insulated flexible electrical power cord being separated from each other at the connection with each module to define a gap that receives and electrically connects with a portion of the circuit board of the module. Each module further includes an overmolding substantially encasing at least the circuit board and the portion of the insulated flexible electrical power cord over which the generally parallel electrical conductors are separated.

In accordance with certain illustrative embodiments shown and described as examples herein, a flexible lighting strip comprises: an insulated flexible electrical power cord including generally parallel electrical conductors that are generally secured together; a plurality of modules spaced apart along and connected with the insulated flexible electrical power cord, each module including a main body supporting one or more light emitting diode (LED) packages, each module electrically connected with the insulated flexible electrical power cord to receive electrical power from the insulated flexible electrical power cord; and a plurality of tiedowns spaced apart along and secured to the insulated flexible electrical power cord.

In accordance with certain illustrative embodiments shown and described as examples herein, a flexible lighting strip comprises an insulated flexible electrical power cord including generally parallel electrical conductors that are generally secured together, and a plurality of modules spaced apart along and connected with the insulated flexible electrical power cord. Each module includes a main body supporting one or more light emitting diode (LED) packages, and a conductive element connected to convey electrical power from the generally parallel electrical conductors of the insulated flexible electrical power cord to the main body, the conductive element including (i) an insulation displacing portion that pierces through insulation of the insulated flexible electrical power cord to electrically contact a selected one or more of the generally parallel electrical conductors and (ii) a barbed or hooked slot defining a recess receiving at least a portion of the insulated flexible electrical power cord and including a retaining barb or hook extending into the recess.

In accordance with certain illustrative embodiments shown and described as examples herein, a flexible lighting strip comprises an insulated flexible electrical power cord including generally parallel electrical conductors that are generally secured together, and a plurality of modules spaced apart along and connected with the insulated flexible electrical power cord. Each module includes: a circuit board operatively connected with one or more light emitting diode (LED) packages and electrically connected with the insulated flexible electrical power cord to receive electrical power from the insulated flexible electrical power cord; an overmolding substantially encasing at least the circuit board, the overmolding including at least one opening accessing the circuit board that corresponds with a positioning pin of a tooling mold used in forming the overmolding; and a sealant disposed over or in the at least one opening, the sealant being effective to prevent water ingress to the circuit board at the at least one opening.

Numerous advantages and benefits of the present invention will become apparent to those of ordinary skill in the art upon reading and understanding the present specification.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 1-6 illustrate a first embodiment.

FIG. 1 shows a perspective view of a portion of a flexible lighting strip according to a first embodiment.

FIG. 2 shows a perspective view of one of the modules of the flexible lighting strip of FIG. 1.

FIG. 3 shows a perspective view of the module of FIG. 2 with the overmolding removed.

FIG. 4 shows a perspective view of one of the conductive elements of the modules of the first embodiment.

FIG. 5 shows another perspective view of the module of FIG. 3 from a different vantage point with the overmolding removed to reveal the circuit board including a notched portion of the circuit board.

FIG. 6 shows a perspective underside view of the module of FIG. 3, along with an adhesive strip positioned for attachment to the underside.

FIG. 8 shows a perspective view of the second embodiment of the module. FIG. 9 shows a perspective view of the module of FIG. 8 with the overmolding removed.

FIG. 10 shows an embodiment including a tiedown secured to the insulated flexible electrical power cord and not connected with and not integral with any of the modules.

FIG. 11 shows an embodiment including a tiedown secured to the insulated flexible electrical power cord and including an attached fastener.

FIG. 12 shows an embodiment including a module with an integral tiedown including an attached fastener.

DETAILED DESCRIPTION OF PREFERRED EMBODIMENTS

Figure 1:
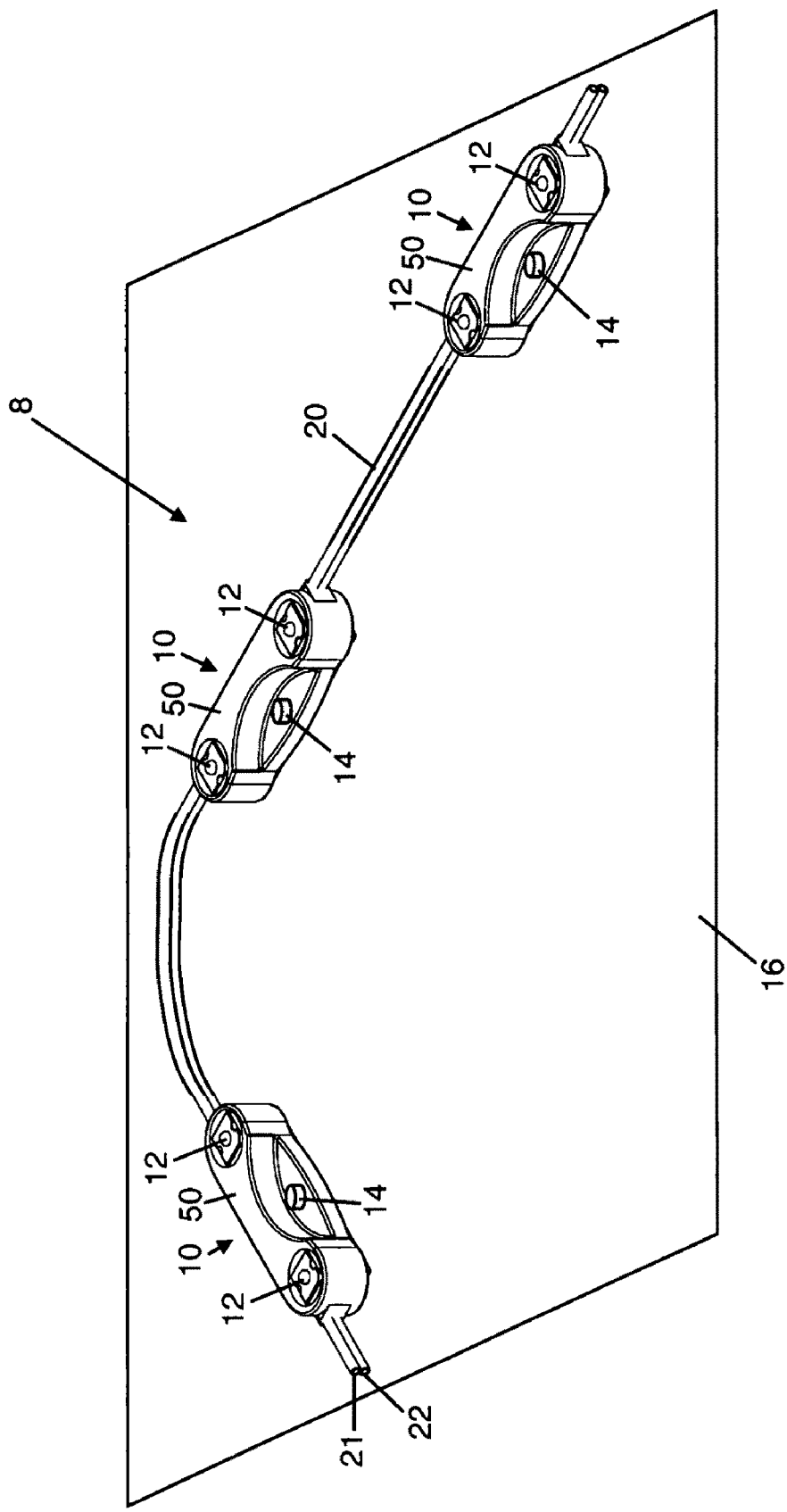
Figure 2:
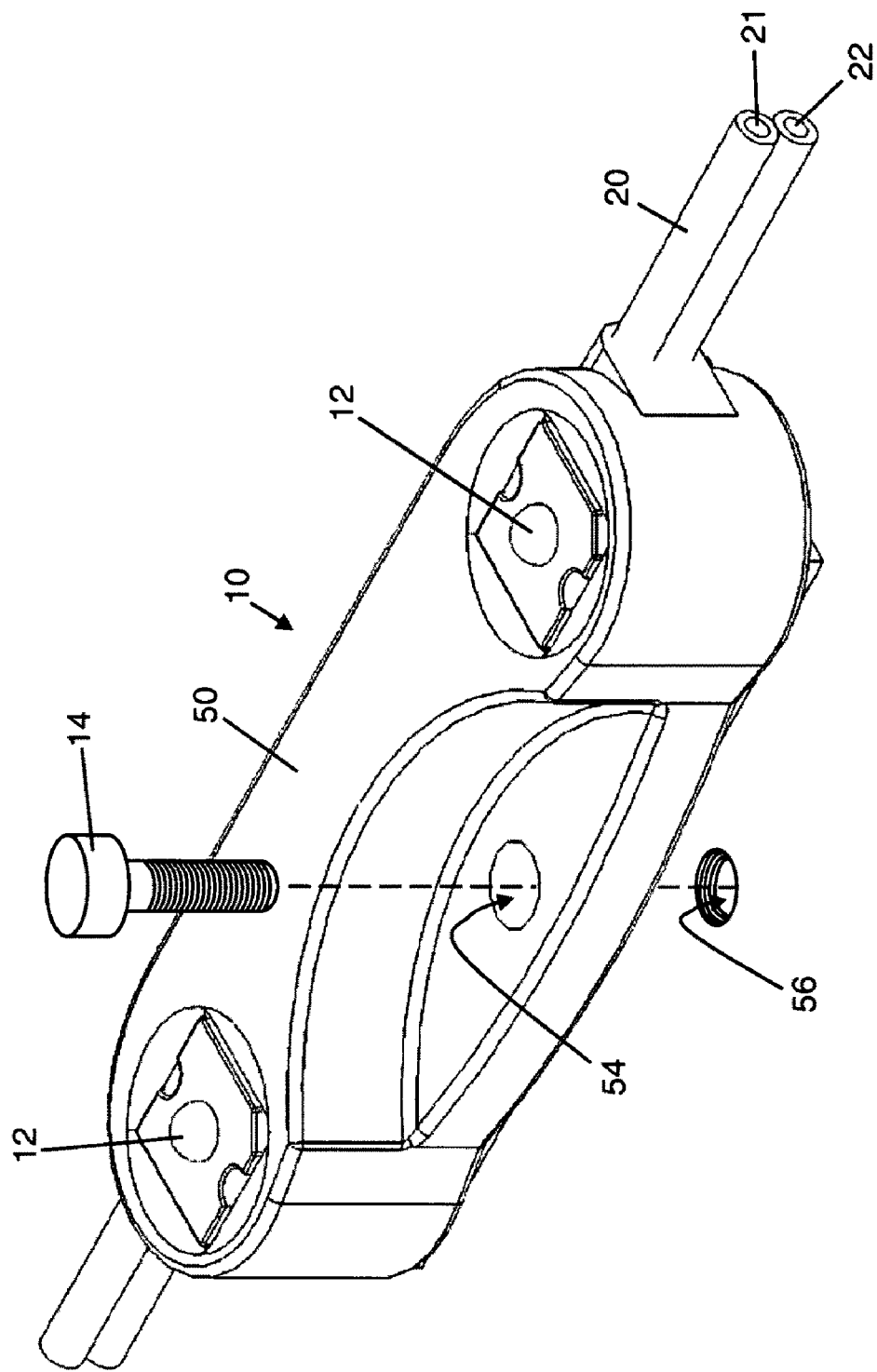

With reference to FIGS. 1-6, a flexible lighting strip 8 includes a plurality of modules 10 each including two light emitting diode (LED) packages 12. Instead of the illustrated two LED packages, each LED module may include one, three, four, five, or more LED packages. Similarly, although the lighting strip 8 of FIG. 1 shows only three modules 10, in a typical installation for channel letter illumination or so forth the flexible lighting strip may include anywhere from two or three modules to several dozen or more modules. Each module 10 is fastened by a suitable fastener, such as an illustrated threaded screw 14, or a rivet, adhesive, or so forth, to a support 16. In some applications, the support 16 is an interior surface of a channel letter housing or other sign housing.

The plurality of modules 10 are electrically interconnected by an insulated flexible electrical power cord 20 including generally parallel electrical conductors that are generally secured together. In the illustrated embodiment, the flexible electrical power cord 20 includes two generally parallel electrical conductors 21, 22 that are generally secured together, which is suitable to enable a parallel interconnection of the modules 10. Although not illustrated, it is to be understood that the generally parallel electrical conductors 21, 22 are electrically energized by a suitable voltage to cause the LED packages 12 to illuminate. In other contemplated embodiments, the flexible electrical power cord 20 may includes three or more generally parallel electrical conductors that are generally secured together, which is suitable to construct a series-parallel electrical interconnection of modules, as set forth for example in Aanegola et al., U.S. Pat. No. 7,114,841 which is incorporated herein by reference in its entirety. In other contemplated embodiments, three or more conductors are included in the flexible electrical power cord to construct an interconnection of the modules 10 in which different modules can be selectively powered by applying electrical power to different selected ones, pairs, or other combinations of the generally parallel electrical conductors, or so forth. For example, some modules may have blue LED packages connected to a blue power conductor of the flexible electrical power cord, others may be red LED packages connected to a red power conductor, and still others may be green LED packages connected to a green power conductor. By selectively energizing one or more of the red, green, and blue power conductors, various colored light, or white light, may be generated.

Each light emitting diode package 12 typically includes a light emitting diode chip made of one or more layers or portions of a group III-nitride semiconductor or semiconductor structure, a group III arsenide semiconductor or semiconductor structure, a group III-phosphide semiconductor or semiconductor structure, another light emissive semiconductor material or layered or otherwise organized arrangement of such semiconductor materials, an organic semiconductor or semiconductor structure, or so forth. The light emitting diode chip is electrically connected to electrical leads or a lead frame and is optionally mechanically sealed by a suitable light-transmissive encapsulant. Optionally, the light emitting diode packages may include other elements, such as a microlens, redundant leads, heat-sinking metallic slug, a submount optionally incorporating electrostatic discharge protection circuitry, a reflective cup containing the light emitting diode chip, a wavelength converting phosphor, or so forth. In some embodiments, a single light emitting diode package may include two or more light emitting diode chips, such as red, green, and blue light emitting diode chips defining an "RGB" type color-controllable light emitting diode package.

With particular reference to FIG. 3, each module 10 includes a circuit board 26 on which the LED packages 12 are mounted. The circuit board 26 includes circuitry, such as printed circuitry (not shown), that provides a power delivery path from conductive elements 30 disposed on opposite sides of the circuit board 26 to the LED packages 12. Although not shown, the circuit board 26 optionally supports additional components such as power regulation circuitry, electrostatic discharge (ESD) protection, or so forth, such components being suitably embodied as integrated circuit components, discrete components, or a combination thereof.

Figure 5:
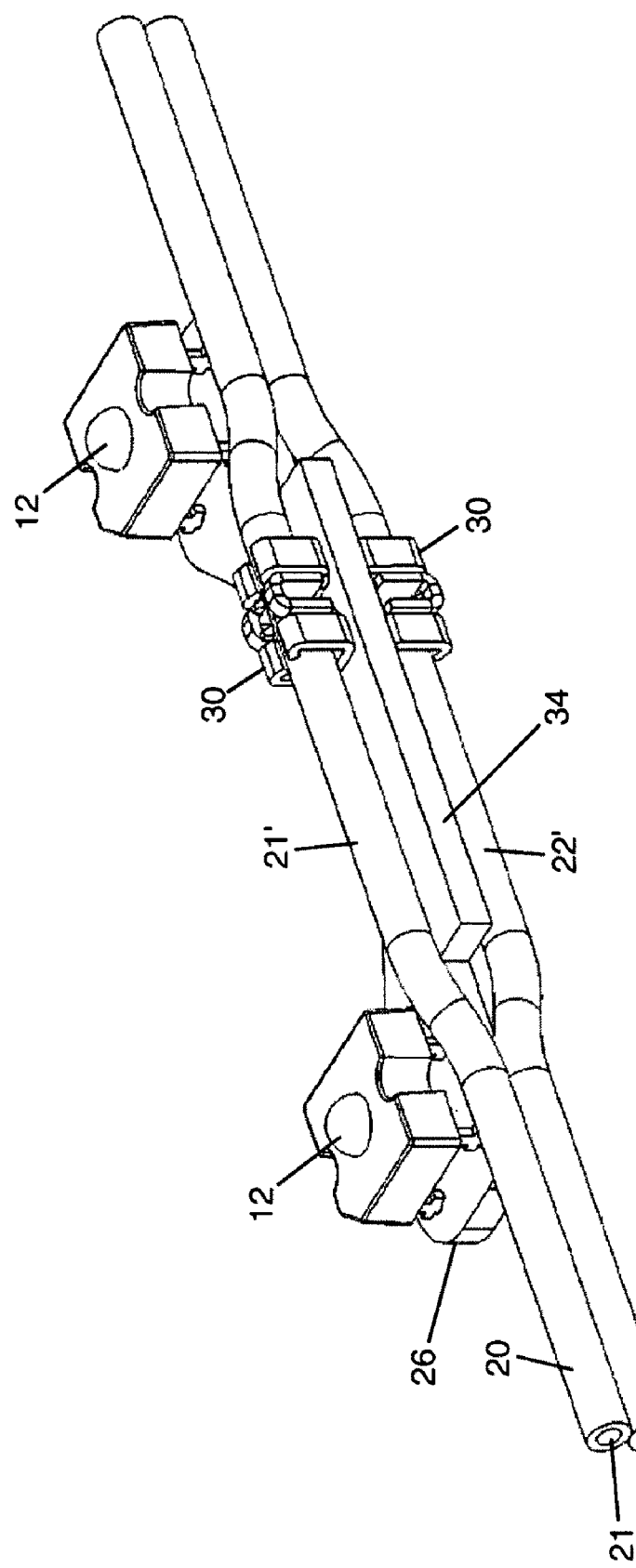

In the embodiment of FIGS. 1-6, and with particular reference to FIG. 5, the insulated flexible electrical power cord 20 includes generally parallel electrical conductors 21, 22 that are generally secured together. However, at the connection of each module 10 to the insulated flexible electrical power cord 20, the generally parallel electrical conductors of the insulated flexible electrical power cord are separated from each other to define separated portions 21', 22' having a gap therebetween that receives a portion 34 of the circuit board 26 of the module 10. This arrangement has certain advantages, including providing a lower profile for the module 10, providing good securing of the module 10 to the insulated flexible electrical power cord 20, and so forth. The conductive elements 30 disposed on opposite sides of the circuit board 26 are connected with the separated generally parallel electrical conductors 21', 22' so as to supply electrical power to the module 10 and to the LED packages 12 in particular via circuitry of the circuit board 26, and optionally through intermediate components such as voltage or current regulating circuitry. One advantage of this arrangement is that the insulated flexible electrical power cord 20, which is generally planar, is oriented with the cord plane transverse to the mounting surface which promotes flexing of the cord in the plane of the surface of the support 16 (best seen in FIG. 1), while the circuit board 26 is positioned with its plane parallel with the mounting surface which enables multiple LED packages 12 to be disposed on the circuit board 26 all illuminating in the same general direction.

With reference to FIGS. 1-6 and with particular reference to FIGS. 3 and 4 and with more particular reference to FIG. 4, in some embodiments the conductive elements 30 are constructed to facilitate rapid assembly of the module as follows. As best seen in FIG. 4, each conductive element 30 includes an insulation-displacing portion 40 that pierces through insulation of the proximate one of the separated generally parallel electrical conductors 21', 22' to electrically connect with the proximate one of the separated generally parallel electrical conductors. Additionally, each conductive element 30 optionally includes a conductor-retaining portion 42 configured to receive and hold the proximate one of the separated generally parallel electrical conductors. In the illustrated embodiments, the conductor-retaining portion 42 includes a barbed or hooked slot defining a recess 44 receiving the proximate one of the separated generally parallel electrical conductors 21', 22' and including barbs or hooks 46 extending into the recess 44 to retain the proximate one of the separated generally parallel electrical conductors 21', 22'. (Note that elements 40, 42, 44, 46 are labeled only in FIG. 4). In addition to facilitating assembly, the conductor-retaining portions 42 promote reliability and robustness by reducing a likelihood of inadvertent dislodging of the separated generally parallel electrical conductors 21', 22' from the conductive elements 30 during the manufacturing process. Although the conductor-retaining portions 42 are advantageous, it is also contemplated to omit these features. For example, a alternative approach is to use conductive elements that include only insulation-displacing portions but not conductor-retaining portions. (It will be appreciated, however, that the insulation displacing portions in such embodiments would have the effect of providing some tendency toward retention of the separated conductors 21', 22' due to the piercing of the insulation by the conductive elements). In another contemplated approach, a portion of each separated generally parallel electrical conductor 21', 22' lying along the circuit board 26 is stripped of insulation and soldered to an underlying electrical pad of the circuitry of the circuit board 26 to provide electrical connection. In such an embodiment, conductor-retaining features are optionally omitted, or optionally retained and mounted to the circuit board 26 and coupled to the conductors 21', 22' to secure the separated generally parallel electrical conductors 21', 22' along the circuit board 26.

To further promote reliability and robustness against ingress of water or other environmental damage, the modules 10 include an overmolding 50 that encases at least the circuit board 26, and preferably also encases the conductive elements 30 and the separated generally parallel electrical conductors 21', 22'. In some suitable injection overmolding approaches, after the LED packages 12 are mounted on the circuit board 26 and the separated generally parallel electrical conductors 21', 22' are connected with the conductive elements 30, the assembly is disposed in an injection region of a tooling mold that includes pins receiving and isolating the LED packages 12. Optionally, a gasket (not shown) is installed on the circuit board to help seal the pins to prevent ingress of the molding material into the pins and over the LED packages 12. In other embodiments, the pin contacts an outer region of the LED package 12 to form a seal protecting a light-emitting central portion of the LED package 12. Once the assembly is loaded into the injection mold, an overmolding material is injected into the tooling mold, optionally under an applied pressure. The injected overmolding material is blocked by the pins and optional cooperating annular gaskets from reaching the LED packages 12. The injected liquid overmolding material solidifies in the tooling mold to form the illustrated overmolding 50. In some embodiments, the overmolding 50 is an injected thermoplastic overmolding. In some embodiments, the overmolding 50 is a polyvinyl chloride (PVC) material. After the injected overmolding material solidifies to define the overmolding 50 having openings defined by the pins that leave the light emitting diode packages 12 exposed, assembly is removed from the mold.

As a further measure to promote robustness and reliability, in the embodiment of FIGS. 1-6 an arrangement is provided to avoid mechanically stressing the circuit board 26 during fastening of the modules 10 to the support 16. It is recognized herein that if the illustrated screw 14 or other mechanical fastener such as a rivet or bolt is secured through the circuit board, this results in stress to the relatively fragile circuit board that would lead to a statistically substantial number of failures during installation, and would produce lower levels of mechanical stress in the circuit boards that do not break during installation that is likely to adversely impact long-term reliability. These difficulties are addressed as follows. The circuit board 26 includes a cavity or indentation 52, as shown, or an opening. Then, the overmolding 50 is formed using a tooling mold that defines the overmolding 50 with a slot or opening 54 aligned with the cavity, indentation, 52 or opening of the circuit board 26. The slot or opening 54 in the overmolding 50 is configured to receive the fastener 14 to fasten the module 10 without applying substantial mechanical stress to the circuit board 26. For example, the illustrative screw fastener 14 passes through the illustrative overmolding opening 54 without passing through the circuit board 26 (due to the cavity or indentation 52) and threads into a threaded hole 56 in the support 16. Optionally, the cavity, indentation, 52 or opening of the circuit board 26 is omitted, and the slot or opening in the overmolding is provided by having the overmolding extend laterally substantially beyond the lateral extend of the circuit board. However, having the slot or opening 54 in the overmolding 50 aligned with the cavity, indentation, 52 or opening of the circuit board 26 has certain advantages. This arrangement ensures that the fastener exerts its fastening force relatively closer to the center of mass of the module 10, which arrangement is less likely to break during installation and provides a more stable fastening that promotes long-term reliability and robustness. Additionally, this arrangement provides a smaller footprint for the module 10, which allows for placement in more confined quarters such as small or narrow illuminated sign housings.

With particular reference to FIG. 5, in the embodiment of FIGS. 1-6 the portion 34 of the circuit board 26 that is received into the gap defined by the separated generally parallel electrical conductors 21', 22' is notched such that the portion 21', 22' of the insulated flexible electrical power cord 20 over which the generally parallel electrical conductors are separated is shorter than the circuit board 26. This arrangement has a beneficial stress-reducing effect on the juncture between the separated generally parallel electrical conductors 21', 22' and the unseparated area. The notches also facilitate having the overmolding 50 fully cover the separated generally parallel electrical conductors 21', 22' such that the cord extending out of the overmolding 50 is not separated. That is, the overmolding 50 substantially encases both the circuit board 26 and the portion 21', 22' of the insulated flexible electrical power cord 20 over which the generally parallel electrical conductors are separated.

Figure 6:
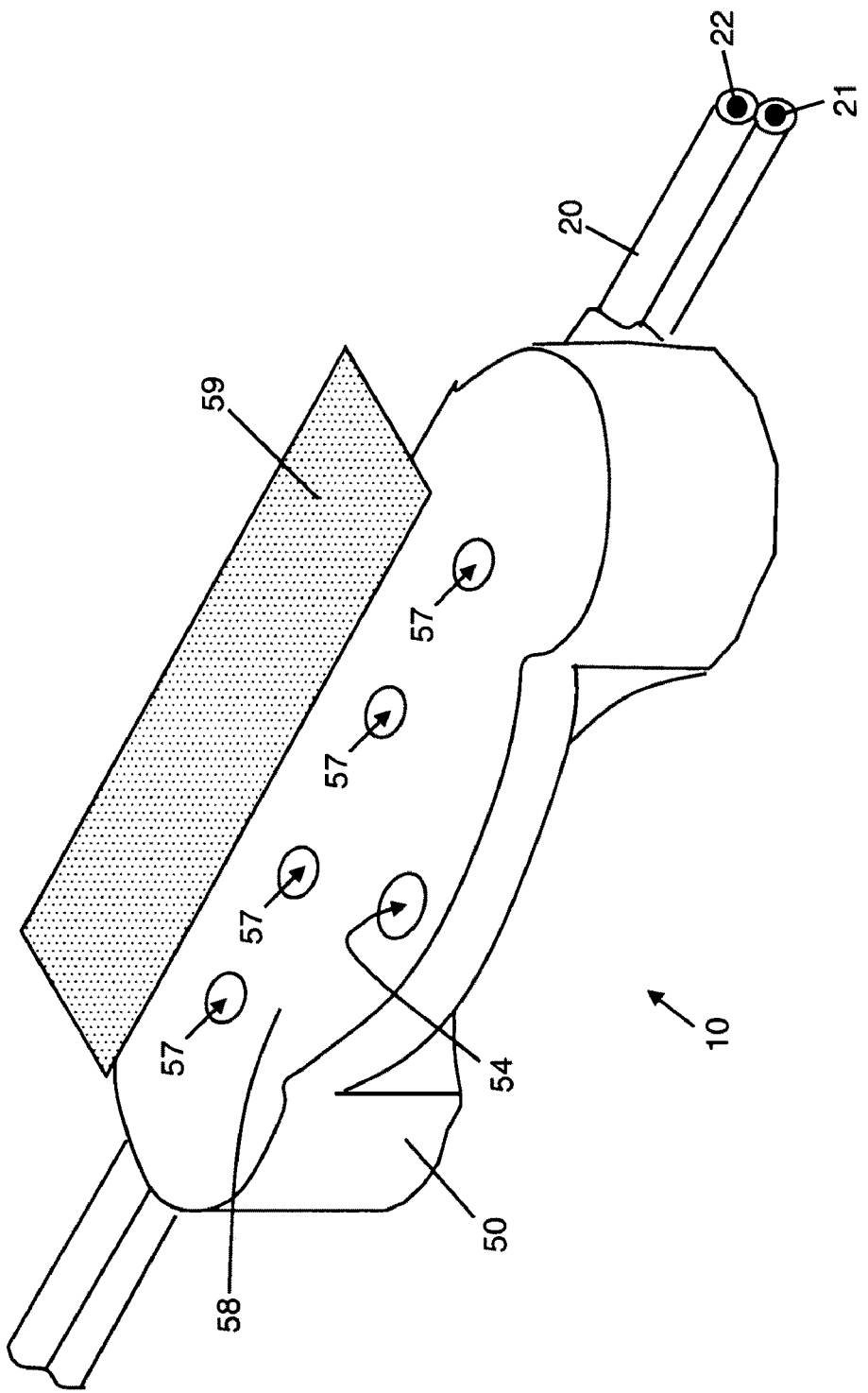

With particular reference to FIG. 6, if the overmolding 50 is formed by injection overmolding or a similar overmolding process, then there are typically one or more openings 57 passing through the overmolding 50 to the circuit board 26 or other encased component. In the illustrated embodiment, some such openings are aligned with the LED packages 12. The pins of the tooling mold that align with the LED packages 12 typically rest upon either the LED package 12 or the surrounding portion of the circuit board 26, and provide frontside stabilizing force to position and hold the assembly in the tooling mold. Backside openings 57 are generated by backside pins that align and provide backside stabilizing force against the circuit board 26 to position and hold the assembly in the tooling mold. After the overmolding material is injected into the tooling mold and solidifies, the tooling mold is removed thus leaving the openings 57 in the backside of the overmolding 50 that access the circuit board 26. Such openings provide potential points for water ingress that can lead to damage of the circuit board 26 or other encased components. It is contemplated to include gaskets that meet with the pins and remain behind after the tooling mold is removed. Such gaskets can form a seal with the overmolding 50 to suppress water ingress. In another approach, shown in FIG. 6, the backside openings 57 exit at a generally planar surface 58 that is covered with an adhesive tape, strip, or so forth 59 (shown in exploded view) to suppress water ingress at the openings 57. In some embodiments, the adhesive strip 59 is advantageously a double-sided adhesive tape having adhesive on both sides of the tape. Such double-sided adhesive tape advantageously can both provide a sealing effect for the openings 57 and also facilitate positioning of the module 10 on the support 16. In some embodiments, it is contemplated for such double-sided adhesive tape to serve as the sole mechanism for securing the module 10 to the support 16, in which case the fastening opening 54 is optionally omitted. In some embodiments, it is contemplated for such double-sided tape to serve as a positioning aid, but to rely upon the fastener 14 inserted into the fastening opening 54 to secure the module 10 to the support 16. In some embodiments, the adhesive strip 59 is VHB™ tape (available from 3M™, St. Paul, Minn.). The openings 57 exit at the generally planar surface 58 disposed on a backside of the module 10 opposite the frontside where the LED modules 12 are mounted. This is advantageous because it places the openings 57 far from most electrically active components, so that even if some water ingresses the likelihood of electrical component degradation is reduced. Sealing the bottom side openings 57 by the illustrated adhesive tape or strip 59, or by epoxy, additional overmolding provided by a two-shot overmolding process, or another sealant, further reduces a likelihood of water ingress-related degradation. While it is advantageous to have the openings on the backside, it is also contemplated for the openings to exit at a side other than the backside, such as at a generally planar sidewall that may optionally also be used as a mounting surface for mounting the module to the support 16.

Figure 7:
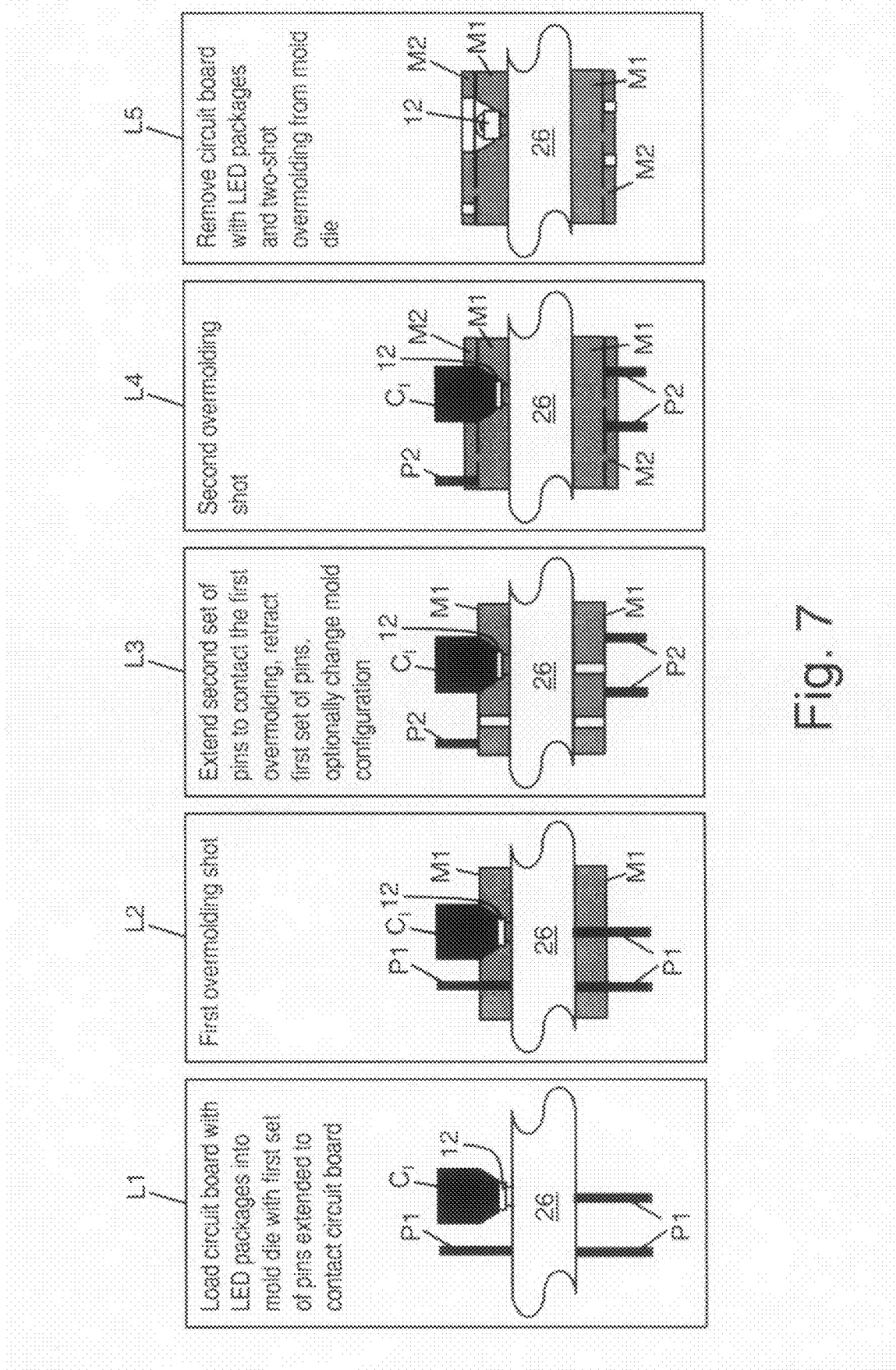
FIG. 7 diagrammatically shows a two-shot overmolding process used in fabricating some lighting unit embodiments.

With reference to FIG. 7, in one approach a two-shot overmolding process is used to generate the overmolding 50 and to seal the bottom side openings 57 as well as to provide underfill for the LED packages 12. In a loading operation L1, the circuit board 26 with the LED packages 12 attached is loaded into a two-shot injection mold die that includes the capability to extend and retract selected piece-holding pins and, in some such mold die, the capability to reconfigure the injection volume between overmolding shots. In the loading operation L1, first pins P1 are extended to hold the circuit board 26, and an isolation cap C, extends over the LED package 12 to seal at least a light-emitting portion of the LED package 12 off from the injection volume. The diagrammatic representation shows three representative first pins P1 holding the circuit board 26, along with the illustrative isolation cap $C_I$. Note that the diagrammatic representation does not show the volume-defining surfaces of the mold die. In a first overmolding operation L2, a first overmolding shot is applied forming overmolding M1 diagrammatically shown in FIG. 7. In a changeover operation L3, a second set of piece-holding pins P2 is extended to contact the first overmolding M1, while the first set of pins P1 are retracted thus leaving openings in the first overmolding M1. Optionally, the mold die is also reconfigured by moving mold elements in or out to change the injection volume. In a second overmolding operation L4, a second overmolding shot is applied forming overmolding M2 that fills in the openings left by retraction of the first pins P1. In an unloading operation L5, the piece is removed from the two-shot mold die.

In the embodiment shown in FIG. 7, the first and second overmolding shots inject the same type of overmolding material. As a result, the second overmolding M2 fills in the openings in the first overmolding M1 to produce a substantially continuous overmolding of a single material. In other contemplated embodiments, the second shot may inject a different type of overmolding material. In the embodiment of FIG. 7 the first shot produces most of the overmolding and the second shot is of smaller injection volume and fills in the openings left by the first pins P1. Restriction of the volume filled by the second overmolding shot is suitably achieved by reconfiguring the mold die to reduce the injection volume during the reconfiguration operation L3. The injection volume of the second shot is also reduced by the volume already occupied by the first overmolding M1. In other embodiments, the first shot may have the smaller injection volume, for example being limited by the mold die configuration to laying down limited-area pads of overmolding material on the circuit board 26, such that during the reconfiguration operation L3 the second pins contact these small areas and the second shot then provides the majority of the volume of the overmolding.

In the illustrated embodiment, the LED package 12 is covered by the isolation cap $C_I$. More particularly, in the illustrated embodiment the isolation cap $C_I$ contacts the sides of the LED package 12 to seal the light-emitting portion of the LED package 12, but not the region proximate to the circuit board 26. The first overmolding M1 then underfills a gap between the LED package 12 and the circuit board 26 as shown in FIG. 7. It is to be appreciated that while FIG. 7 shows the isolation cap $C_I$ sealing the LED package 12 illustrated in FIG. 7, in general if there are multiple LED packages then each LED package is similarly sealed by a corresponding isolation cap. While in the illustrated embodiment the isolation cap $C_I$ seals only the light emitting portion of the LED package 12 to enable the overmolding to underfill the LED package 12, in other embodiments the isolation caps may contact the circuit board 26 to seal the entire LED package 12 from the injection volume. In the illustrated embodiment, the isolation cap $C_I$ remains in place during the reconfiguration operation L3 so that the light emitting portion of the LED package 12 remains sealed during the second overmolding shot. In such an embodiment, the overmolding material used in both overmolding shots L2, L4 can be opaque since the light emitting portions of the LED packages 12 are not covered. In other embodiments, it is contemplated to retract the isolation caps during the reconfiguration and to use a light-transmissive second overmolding material that covers the LED packages 12. In yet other embodiments, it is contemplated to leave the LED packages 12 exposed to the injection volume during the first shot and to use a light-transmissive material for the first shot, and then to extend isolation caps over the LED packages 12 to contact the light-transmissive first overmolding to ensure that the second shot, which may use an opaque material, does not cover the LED packages 12. While a two-step overmolding process is described with reference to FIG. 7, it will be appreciated that a multi-step overmolding process including the illustrated two shots, or including three shots, or more shots, can be used. Still further, while lighting units with multi-shot overmolding are described with reference to the illustrative application of flexible lighting strips, it will be appreciated that other types of lighting units including LED packages mounted on circuit boards with multi-shot overmolding can be similarly constructed.

Figure 8:
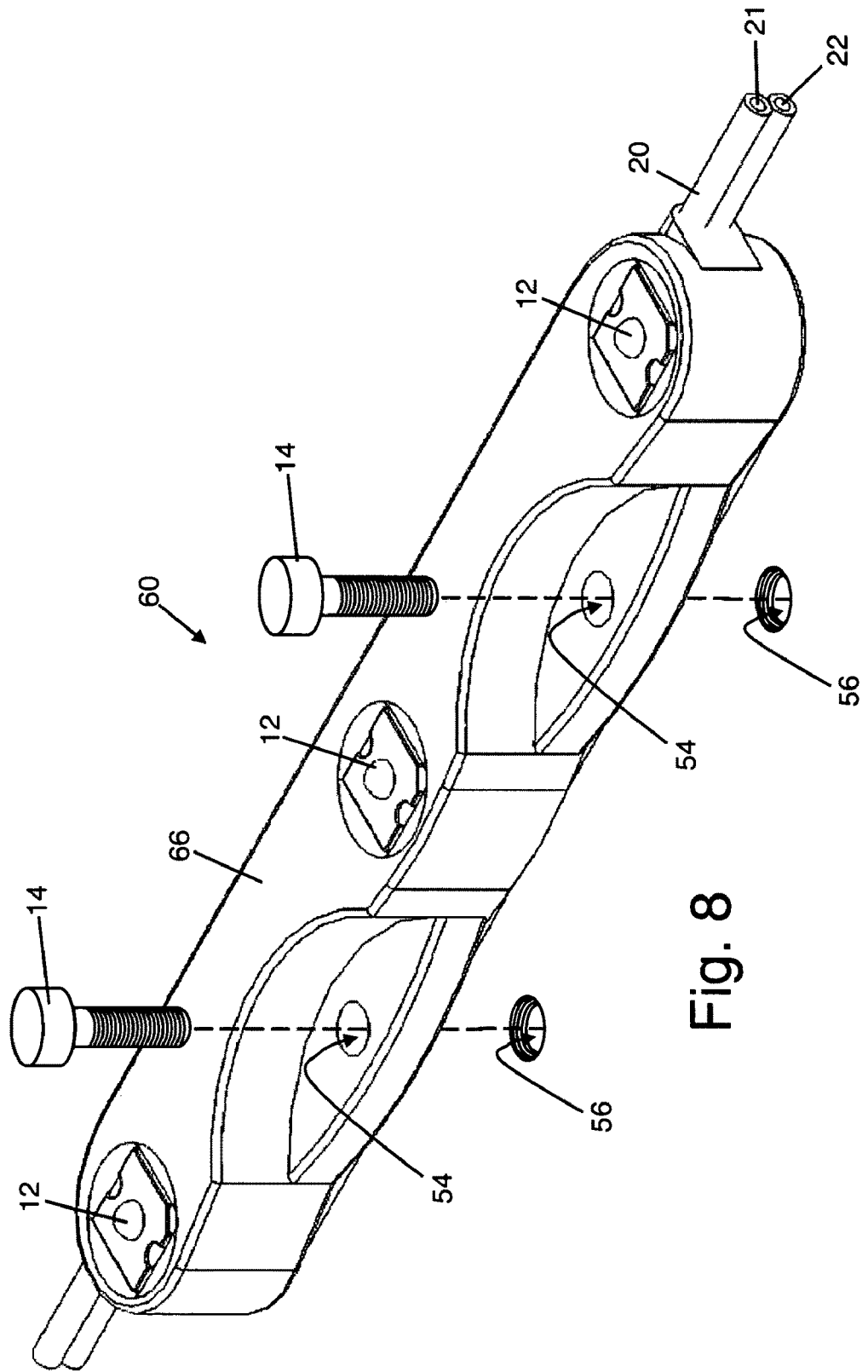
FIGS. 8 and 9 show a second embodiment of a module that includes three light emitting diode (LED) packages.
Figure 9:
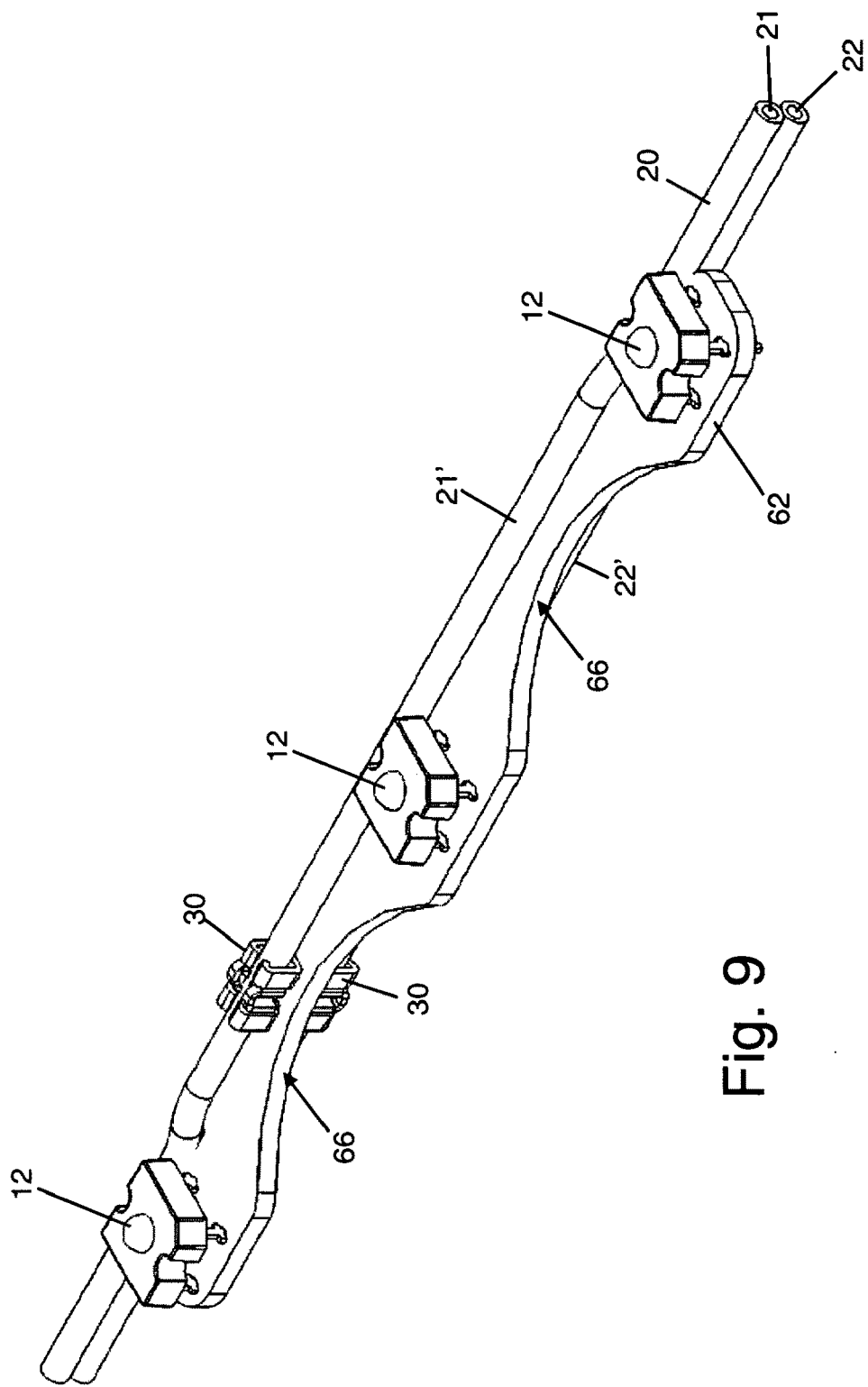

With reference to FIGS. 8 and 9, a second embodiment module 60 includes a longer circuit board 62 suitable for supporting three LED packages 12. The longer circuit board 62 has two cavities or indentations 64, and a correspondingly longer overmolding 66 includes two openings 54 aligned with the two cavities or indentations 64. The modules 10, 60 are illustrative examples, and it is contemplated to include only some of the manufacturability, reliability, and robustness enhancing features in various embodiments. For example, in one contemplated variation (not shown), the electrical conductors of the insulated flexible electrical power cord are not separated at the connection with the module, but rather both conductors (for a two conductor cord embodiment) pass on the same side of the circuit board. Such an embodiment suitably omits the notched portion 34 of the circuit board, but suitably includes the conductive elements 30 with one or more a conductor-retaining portions sized to receive the entire cord, and suitably retains the circuit board cavity or indentation aligning with a fastening opening or slot in the overmolding. In the illustrated embodiments the modules 10, 60 each have a main body including at least the circuit board 26, 62 and the overmolding 50, 66. As another example of a contemplated variant embodiment, each module may include a main body that does not include the illustrated circuit board or overmolding, but which is connected with the insulated flexible electrical power cord by the conductive elements 30 configured as illustrated with both insulation displacing and conductor-retaining portions.

With reference to FIG. 10, as noted previously the arrangement of an overmolding having a fastening opening or slot that aligns with a cavity, indentation, or opening of the circuit board advantageously substantially reduces mechanical stress on the circuit board during and after installation, thus increasing ease and reliability of installation and long-term robustness and reliability. However, the direct fastening of the modules 10, 60 to the support 16 does produce some mechanical stress on the modules 10, 60 overall, and potentially some residual stress on the encased circuit board 26 in particular. To further enhance ease and reliability of installation and long-term operational reliability and robustness, in the embodiment of FIG. 10 a modified module 70 is used, which includes two LED packages 12 and an overmolding 72, but with no provision in the overmolding 72 or elsewhere in the module 70 for fastening the module to the support 16. Instead, tiedowns 74 are separately secured to the insulated flexible electrical power cord 20 and are not connected with and not integral with any of the modules 70. The illustrated tiedowns 74 include a fastening structure having an opening 76 or slot configured to receive one of the fasteners 14. In this way, the mechanical stress of the fastening is borne entirely by the separate tiedowns 74 and does not impact the modules 70. The tiedowns 74 are suitably formed by overmolding onto the insulated flexible electrical power cord 20, and in some embodiments are made using the same injection overmolding process used to form the overmolding 72. In such an approach, the tiedowns 74 and the module overmolding 72 are formed in a single-step overmolding process using a tooling mold having three separate injection cavities—one to form the overmolding 72, and two additional separate injection cavities on either side of the module used to form the tiedowns 74. In such embodiments, each tiedown 74 is an overmolding encasing a portion of the flexible electrical power cord 20 at which the tiedown 74 connects with the flexible electrical power cord 20.

With reference to FIG. 11, a variant embodiment includes the modules 70 as in the embodiment of FIG. 10, and further includes separate, isolated tiedowns 84 corresponding to the tiedowns 74 of FIG. 10 and including openings 86 corresponding to the openings 76 of the tiedowns 74. However, the tiedowns 84 differ from the tiedowns 74 in that each tiedown 84 further includes an integral fastener 14' and an integrally formed connecting member 88 connecting the integral fastener 14' and the fastening structure including the opening 86. The connecting member is bendable or breakable to enable the integral fastener 14' to be received into the opening 84 or slot of the fastening structure. For example, in some embodiments the connecting member 88 is highly elastically bendable so that the integral fastener 14' can be inserted into the opening 84 with the connecting member 88 bent but not broken. In other embodiments, the connecting member 88 is breakable so that the integral fastener 14' can be removed during installation and inserted into the opening 84. In a suitable manufacturing approach, the tiedowns 84 are formed by overmolding onto the insulated flexible electrical power cord 20 as described for the tiedowns 74. In such embodiments, the module overmolding 72, the integral fastener 14', the connecting member 88, and the fastening structure having the opening 84 are all made of the same material, such as PVC if that is the selected overmolding material. In another suitable manufacturing approach, the fastener 14' can be an insert molded fastener, such as a self-drilling screw, rivet, or plastic fastener to be inserted into a pre-drilled hole in the back plane.

With reference to FIG. 12, while certain advantages to having tiedowns separate from the modules have been set forth, it is also contemplated to have one or more tiedowns with integral fasteners formed integrally with and physically connected with a module. FIG. 12 illustrates such a module 90 including two LED packages 12 secured to the insulated flexible electrical power cord 20, and further including an integral tiedown 94 with the opening 86, the integral fastener 14', and a longer integrally formed connecting member 98 retaining the integral fastener 14' with the module 90. The longer connecting member 98 enables the fastener 14' to be brought over the top of the module 90 to reach the opening 86. Alternatively, if the connecting member is broken to release the fastening member 14' before insertion into the opening 86, then a shorter connecting member can be used. The module 90 can be formed as an integrated unit by overmolding.

Having the tiedowns 84, 94 overmolded on the insulated flexible electrical power cord 20 promotes easy installation. For example, in an illuminated cabinet application, the cabinet designer sometimes uses a numerically controlled router that both cuts out the backplane of the cabinet and pre-drills holes in the backplane. In such a case, the flexible lighting strip of FIG. 11 or of FIG. 12 can then be installed with no needed additional components—the fasteners 14' are integrally included with the flexible lighting strip. This simplifies installation process, because only a single part is ordered (the flexible lighting strip of FIG. 11 or of FIG. 12). If the installation is performed on-site there is no possibility that the installer will forget to bring fasteners or will bring too few fasteners to complete the installation.

Where tiedowns that are separate from the modules are included, the separate tiedowns 74, 84 can be used in various combinations with various modules. For example, although the tiedowns 74, 84 are illustrated in conjunction with the modules 70 that do not have fastener-receiving slots or openings, it is also contemplated to use the tiedowns 74, 84 in conjunction with the modules 10 or the modules 60 which do have fastener-receiving slots or openings 54. Moreover, in some contemplated embodiments the separate tiedowns 74, 84 are overmolded onto the insulated flexible electrical power cord 20 as described, but the modules are snap-on units that do not include overmolding, may or may not include a circuit board, and may or may not include fastener-receiving slots or openings. Such overmolded tiedowns can improve manufacturing efficiency even when the modules are snap-on units that do not include corresponding overmolding. For example, in one contemplated manufacturing approach, the tiedowns are overmolded onto the insulated flexible electrical power cord in an automated fashion in which a feeder advances the cord a preset distance, the tooling mold closes and a tiedown is formed by injection molding, the tooling mold automatically opens, the power cord is advanced another preset distance, and the process repeated to form overmolded tiedowns spaced apart by the preset distance along the power cord. Then, the snap-on modules can be attached either at the manufacturing plant or later, for example at the installation site. If the snap-on modules are attached at the manufacturing plant, then the aforementioned benefits of having a single part that can be ordered and installed without concern about separately ordering or providing a sufficient number of fasteners is again realized.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A manufacturing method comprising:
    mounting one or more light emitting diode (LED) packages on a circuit board to define a lighting unit; and
    overmolding the lighting unit using a multi-step overmolding process including:
        securing the lighting unit in a mold die using first piece-holding pins to contact the lighting unit,
        applying a first overmolding shot to form a first overmolding over a first portion of the lighting unit not including at least the portions of the lighting unit contacted by the first piece-holding pins,
        reconfiguring the mold die by reconfiguration operations including at least extending second piece-holding pins to contact the first overmolding and retracting the first piece-holding pins, and
        applying a second overmolding shot to form a second overmolding over a second portion of the lighting unit including at least the portions of the lighting unit contacted by the first piece-holding pins.

2. The manufacturing method as set forth in claim 1, wherein at least one of the securing and the reconfiguring includes sealing off at least a light emitting portion of the one or more LED packages mounted on the circuit board such that at least one of the first overmolding and the second overmolding does not cover at least the light-emitting portion of the one or more LED packages.

3. The manufacturing method as set forth in claim 1, wherein the securing and the reconfiguring includes sealing off a light emitting portion of the one or more LED packages mounted on the circuit board such that the overmolding provides underfilling of the one or more LED packages.

4. The manufacturing method as set forth in claim 1, wherein the securing includes sealing off at least a light emitting portion of the one or more LED packages mounted on the circuit board such that the first overmolding does not cover at least the light emitting portion of the one or more LED packages, the first overmolding being of an opaque material.

5. The manufacturing method as set forth in claim 1, wherein the reconfiguring includes sealing off at least a light emitting portion of the one or more LED packages mounted on the circuit board such that the second overmolding does not cover at least the light emitting portion of the one or more LED packages, the second overmolding being of an opaque material.

6. The manufacturing method as set forth in claim 1, wherein both the securing and the reconfiguring includes sealing off at least a light emitting portion of the one or more LED packages mounted on the circuit board such that neither the first overmolding nor the second overmolding covers the light-emitting portion of the one or more LED packages, both the first overmolding and the second overmolding being of opaque materials.

7. The manufacturing method as set forth in claim 1, wherein the reconfiguring further includes adjusting the injection volume between the applying of the first overmolding shot and the applying of the second overmolding shot.

8. The manufacturing method as set forth in claim 1, wherein the applying of the first overmolding shot and the applying of the second overmolding shot both apply the same type of overmolding material.

9. The A manufacturing method comprising:
   mounting one or more light emitting diode (LED) packages on a circuit board to define a lighting unit; and
   injection overmolding the entire lighting unit except the one or more LED packages using a single type of overmolding material, the injection overmolding including applying a first overmolding shot that covers most of the lighting unit except portions by which the lighting unit is held during the first overmolding shot and applying a second overmolding shot that covers at least the portions by which the lighting unit is held during the first overmolding shot.

10. The manufacturing method as set forth in claim 9, wherein during the first overmolding at least a light emitting portion of the one or more LED packages is sealed off from an injection volume of the first overmolding and during the second overmolding at least said light emitting portion of the one or more LED packages is sealed off from an injection volume of the second overmolding.

11. The manufacturing method as set forth in claim 9, wherein at least one of the first overmolding and the second overmolding underfills a gap between the one or more LED packages and the circuit board.

12. The manufacturing method as set forth in claim 9, wherein the injection overmolding underfills the one or more LED packages.

13. The manufacturing method as set forth in claim 9, wherein the injection overmolding comprises:
   disposing an isolation cap over a light emitting portion of the one or more LED packages, said isolation cap not extending to contact the circuit board, the injection overmolding penetrating a gap between each LED package and the circuit board to underfill the LED package.

14. A manufacturing method comprising:
   mounting one or more light emitting diode (LED) packages on a circuit board to define a lighting unit; and
   injection overmolding the entire lighting unit except the one or more LED packages using a single type of overmolding material wherein the injection overmolding comprises a multi-shot overmolding process in which exposed portions of the circuit board left by piece-holding pins of a first overmolding shot are sealed by a second overmolding shot.

15. The manufacturing method as set forth in claim 14, wherein each shot of the multi-shot overmolding process injects the same type of overmolding material.

16. The manufacturing method as set forth in claim 14, wherein the multi-shot overmolding process is a two-shot overmolding process.

* * * * *

UNITED STATES PATENT AND TRADEMARK OFFICE
CERTIFICATE OF CORRECTION

PATENT NO. : 7,687,288 B2
APPLICATION NO. : 11/821683
DATED : March 30, 2010
INVENTOR(S) : Saha et al.

It is certified that error appears in the above-identified patent and that said Letters Patent is hereby corrected as shown below:

Claim 9, column 13, line 7, delete "The".

Signed and Sealed this

Fifteenth Day of June, 2010

David J. Kappos
*Director of the United States Patent and Trademark Office*